July 15, 1947.   R. E. THOREN   2,424,067
CABLE CLAMP AND SEALING DEVICE
Filed Oct. 28, 1944   2 Sheets-Sheet 1
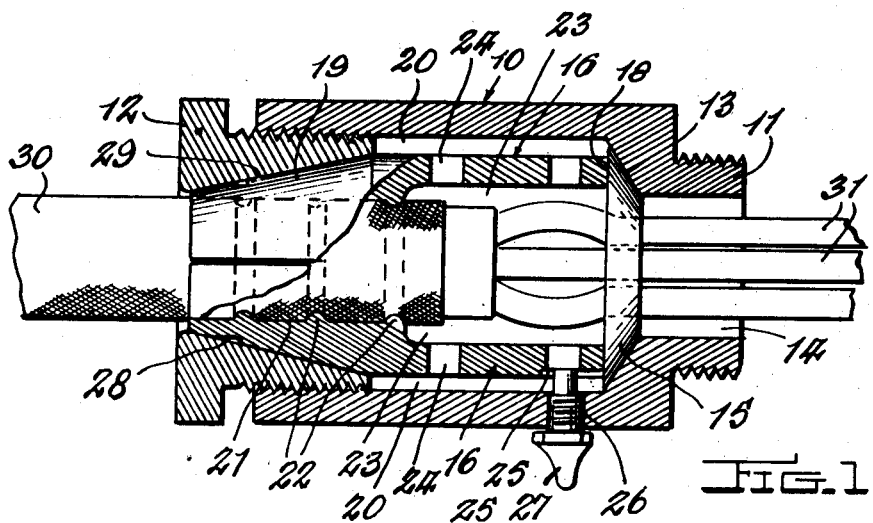
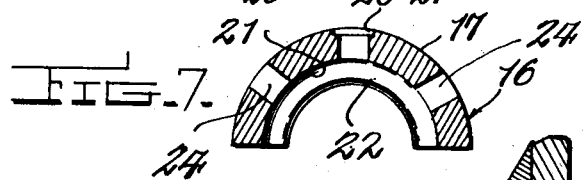
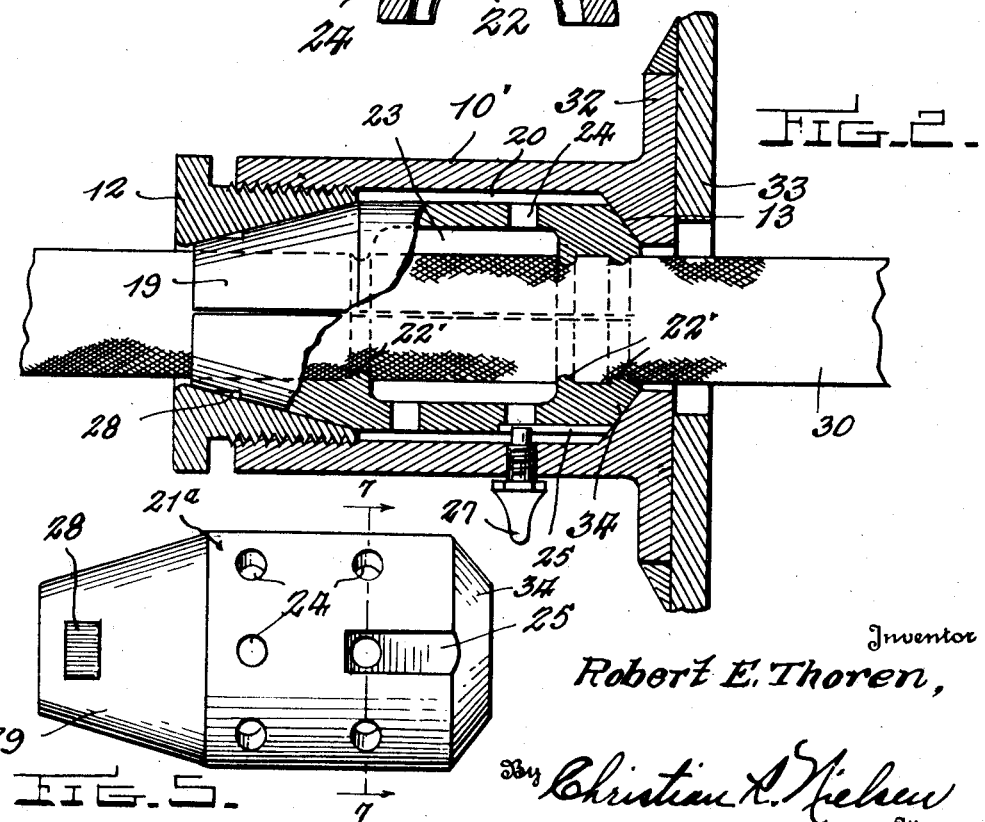
Inventor
Robert E. Thoren,
By Christian A. Nielsen
Attorney

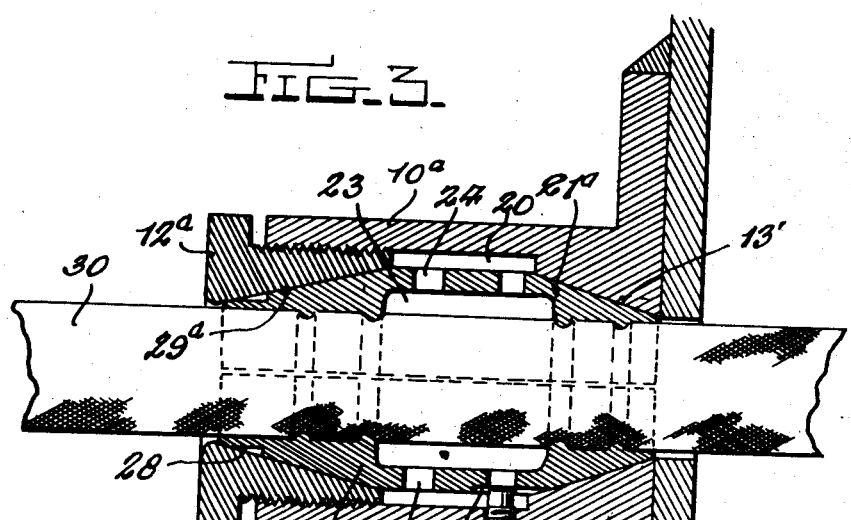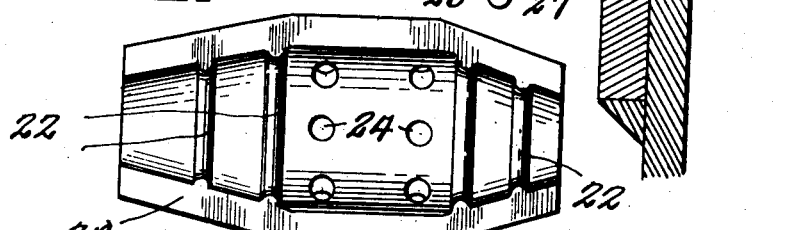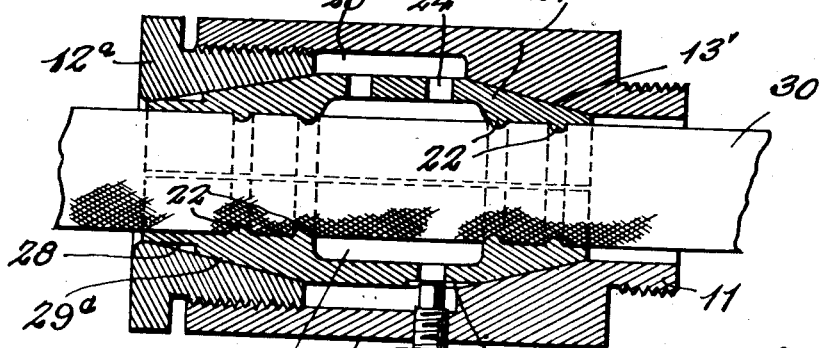

Patented July 15, 1947

2,424,067

UNITED STATES PATENT OFFICE 2,424,067

CABLE CLAMP AND SEALING DEVICE

Robert E. Thoren, Seattle, Wash.

Application October 28, 1944, Serial No. 560,895

3 Claims. (Cl. 174—77)

This invention relates to cable sealing and clamping devices, and it consists in the constructions, arrangements and combinations herein described and claimed.

It is the cardinal object of the invention to provide sealing and clamping devices for use in connection with electrical or other cable which must pass through a watertight bulkhead or junction box as employed in construction of ships.

More specifically it is an object of the invention to provide a clamping and sealing device for cables wherein a housing is employed having means for securement to a bulkhead junction box or the like, the housing being constructed to receive a pair of clamping inserts upon an interposed cable, the inserts being firmly held within the housing by a gland nut, and the housing further including means for admission of a molten sealing agent in and around the inserts and cable.

Additional objects, advantages and features of invention will be apparent from the following description and accompanying drawings, wherein Figure 1 is a sectional view illustrating a terminal tube constructed for accommodation of a standard cable.

Figure 2 is a similar view of a bulk head tube for reception of a standard cable.

Figure 3 is a sectional view of a bulk head tube for use in connection with a self-sealing cable.

Figure 4 is a similar view of a terminal tube for accommodation of a self-sealing cable.

Figure 5 is a plan view of one of the clamp inserts.

Figure 6 is a similar view illustrating the interior surface of one of the clamp inserts.

Figure 7 is a cross sectional view on the line 7—7 of Figure 5.

Attention is first invited to Figure 1, wherein a terminal tube 10 is shown, one end of which is formed with a reduced exteriorly threaded boss 11 for mounting in a bulkhead or for securement to electrical equipment. The opposite end of the tube is interiorly threaded for reception of a gland nut 12.

The tube, 10 is formed with a tapered seat 13 upon the interior thereof concentric with a conductor outlet 14. A phenolic washer 15 is employed having a face tapered and complemental to the seat 13, the opposite face being planiform, for a purpose to be described. The washer is formed with an opening concentric with outlet 14.

A pair of clamp inserts 16 are employed of identical form, consisting of a semi-cylindrical portion 17 having a smooth planiform face 18 at one end, the other end 19 being of tapered formation.

The inserts have longitudinal side walls smoothly finished and when adjusted upon a cable will lie in opposed parallel relation. The over-all diameter of the assembled inserts is considerably less than the interior diameter of the tube 10, thus forming a space 20 circumferentially within the tube when positioned therein. Each insert is formed with a semi-circular opening 21, which when aligned with one another form a circular opening of a diameter to receive a cable therethrough, the opening extending from the tapered end 19 inwardly, and at longitudinally spaced points upon the semi-circular openings 21 arcuate ribs 22 are formed, the innermost rib 22 being located approximately medially of the length of the inserts, defining a termination of the semi-circular opening, the interior wall of the inserts being outwardly relieved to form a concentric passage 23. Each insert 16 is formed with a plurality of radial openings 24 forming communication between the space 20 and the passage 23, for a purpose to be explained.

At a point inwardly of the face 18 and aligned with one of the openings 24, a flattened portion 25 is formed upon the exterior of one of the inserts 21, and aligned with said portion and the opening, the tube 10 is provided with a threaded opening 26 into which a conventional Zerk fitting 27 is engaged. The inner end of the fitting should engage the flattened portion 25 so as to maintain the inserts 16 against rotary movement.

The tapered portions of the inserts are formed with flattened portions 28, arranged in opposed relation, adapted to receive the jaws of a pair of pliers for temporarily securing the inserts upon a cable.

The gland nut 12 is formed with a tapered bore 29 corresponding to the tapered portions 19 of the assembled inserts 16.

In use, the tube 10 is threadedly engaged with a bulkhead, junction box or the like, the interior of the tube 10 and cable 30 are coated with a suitable bonding agent. The gland nut 12 being disposed upon the cable, the inserts 21 are positioned upon the cable at a proper location so that the conductor cables 31 may extend through the outlet 14. A compressive force is applied upon the inserts at points 28 by means of a pair of pump pliers or the like, causing the ribs 22 to crimp the cable slightly. The washer 15 is now placed upon the cable with the planiform face resting against the end 18 of the inserts 16. The assembly is now presented into the tube with the conductor wires extended through the outlet 14. The assembled inserts are now adjusted so as to bring the flattened portion 25 into aligned relation with the fitting 27, when the latter is screwed inwardly so as to engage the flattened portion 25 of the insert, thus maintaining the latter against rotation. The gland 12 is next moved into engagement with the threaded end of the tube 10 and tightened. It will be noted that due to the tapered relation between the inserts 21 and the gland nut 12 inward sliding movement of the inserts is effected, forcing the washer firmly against the seat 13 and at the same time causing the ribs 22 to firmly seat themselves into the cable 30. A molten sealing compound, such as wax, is now forced through the fitting 27 by means of a pressure gun, the compound discharging through openings 24 into the chamber 23 of the inserts. The compound will also be discharged into the space 20 and when hardened, it will be apparent that the cable 30 is securely clamped within the tube as well as effectively sealed therein.

The construction shown in Figure 2 is employed for securing and sealing a standard cable in a bulkhead tube, the parts being identical with those of Figure 1 with the exception that the tube 10' is shown as having a flange 32 to be welded to the bulkhead 33, and the washer 15 omitted, being replaced by forming the inner ends of the inserts with tapered ends 34 complemental to the seat 13. It will also be seen that the inner ends of the inserts are formed upon their inner faces with ribs 22' for gripping the cable immediately outward of the bulkhead.

A modified form of the latter construction is shown in Figures 3 and 4, adapted for use with a self-sealing cable. In these two forms, inserts 21—a have opposite ends tapered to the same degree, and the seats 13' of the tube 10—a and the bore 29—a of the gland nut 12—a formed to correspond therewith. The inserts 21—a are interchangeable with a bulkhead tube or a terminal tube.

From the foregoing, it will be apparent that in each form of the device the cable is firmly secured within the tube against movement which might tend to break the seal around a cable, and that the tube may be quickly and effectively resealed by the mere application of a pressure pump to the fitting 27.

While I have specifically shown and described preferred forms of my cable sealing and clamping device, I consider as my own all such modifications in construction as fairly fall within the scope of the appended claims.

I claim:

1. A cable sealing and clamping device comprising a tube having one end constructed for securement to a supporting wall, the other end being interiorly threaded, a gland nut threadedly engaged in said end, a cable extended through said tube, separable insert members within said tube and disposed about said cable, said insert members having opposed ribs for engaging said cable, and relieved portions forming a circumferential space around said cable, each insert having a plurality of openings forming communication with the interior of the tube, said tube having a valved fitting for admission of a sealing compound within said tube and circumferential space, and said inserts having a tapered end complemental to a tapered bore of said gland nut.

2. A cable sealing and clamping device comprising a tube having one end constructed for securement to a supporting wall, the other end being interiorly threaded, a gland nut threadedly engaged in said end, a cable extended through said tube, a tapered seat within the tube inwardly of the first named end, a pair of semi-circular insert members disposed about said cable, longitudinally spaced semi-annular ribs upon the interior of said inserts in bearing contact with the periphery of the cable, the overall circumference of said inserts being less than the interior diameter of said tube defining a space, said inserts having relieved portions extending over a substantial distance of the length of the inserts forming a passage therearound, openings being formed in said inserts forming communication between said space and passage, a washer complemental to said tapered seat, said inserts having endwise bearing contact with said washer, and having a tapered end opposite thereto, said gland nut having a tapered bore complemental to the tapered ends of said inserts, and a valved fitting on said tube for admission of a sealing compound within and around said inserts.

3. A cable sealing and clamping device comprising a tube having one end constructed for securement to a supporting wall, the other end being interiorly threaded, a gland nut threadedly engaged in said end, a cable extended through said tube, a tapered seat within the tube inwardly of the first named end, a pair of semi-circular insert members disposed about said cable, longitudinally spaced semi-annular ribs upon the interior of said inserts in bearing contact with the periphery of the cable, the overall circumference of said inserts being less than the interior diameter of said tube defining a space, said inserts having relieved portions extending over a substantial distance of the length of the inserts forming a passage therearound, openings being formed in said inserts forming communication between said space and passage, said inserts having tapered ends complemental to said tapered seat and a similarly shaped bore of said gland nut, a valved fitting on said tube for admission of a sealing compound within and around the inserts, and one of said inserts having a flattened portion upon the periphery thereof for accommodation of the inner end of said valved fitting to maintain the inserts against rotary movement upon tightening of said gland nut.

ROBERT E. THOREN.

REFERENCES CITED

The following references are of record in the file of this patent:

UNITED STATES PATENTS

| Number | Name | Date |
| --- | --- | --- |
| 2,331,409 | Markey | Oct. 12, 1943 |
| 1,769,524 | Mample | July 1, 1930 |
| 2,294,738 | Bruno | Sept. 1, 1942 |
| 1,063,827 | Mullin | June 3, 1913 |
| 1,181,451 | Hubbell | May 2, 1916 |
| 1,342,819 | Lake | June 8, 1920 |

FOREIGN PATENTS

| Number | Country | Date |
| --- | --- | --- |
| 52,266 | Norway | 1933 |
| 814,006 | France | 1937 |